UNITED STATES PATENT OFFICE.

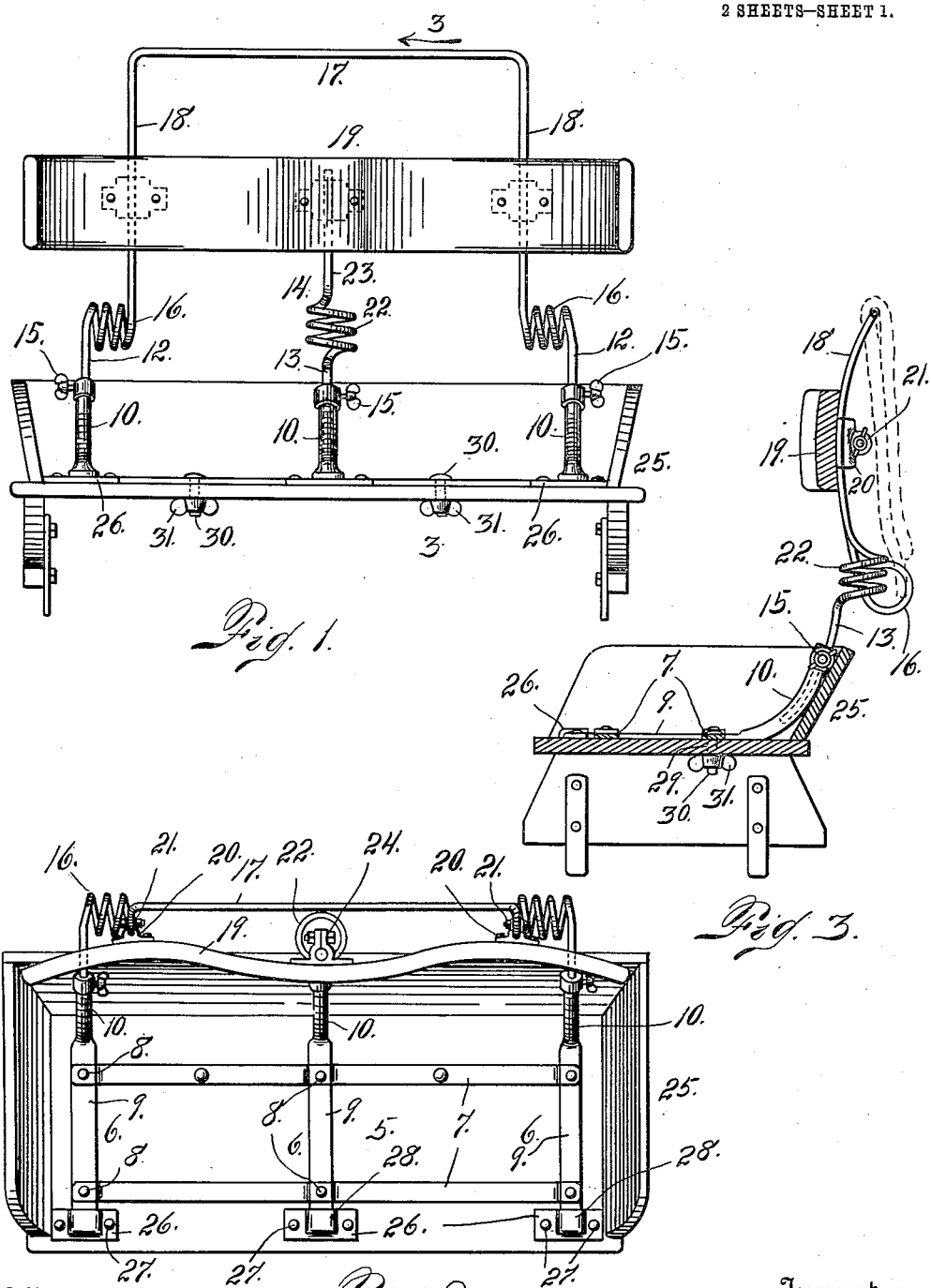

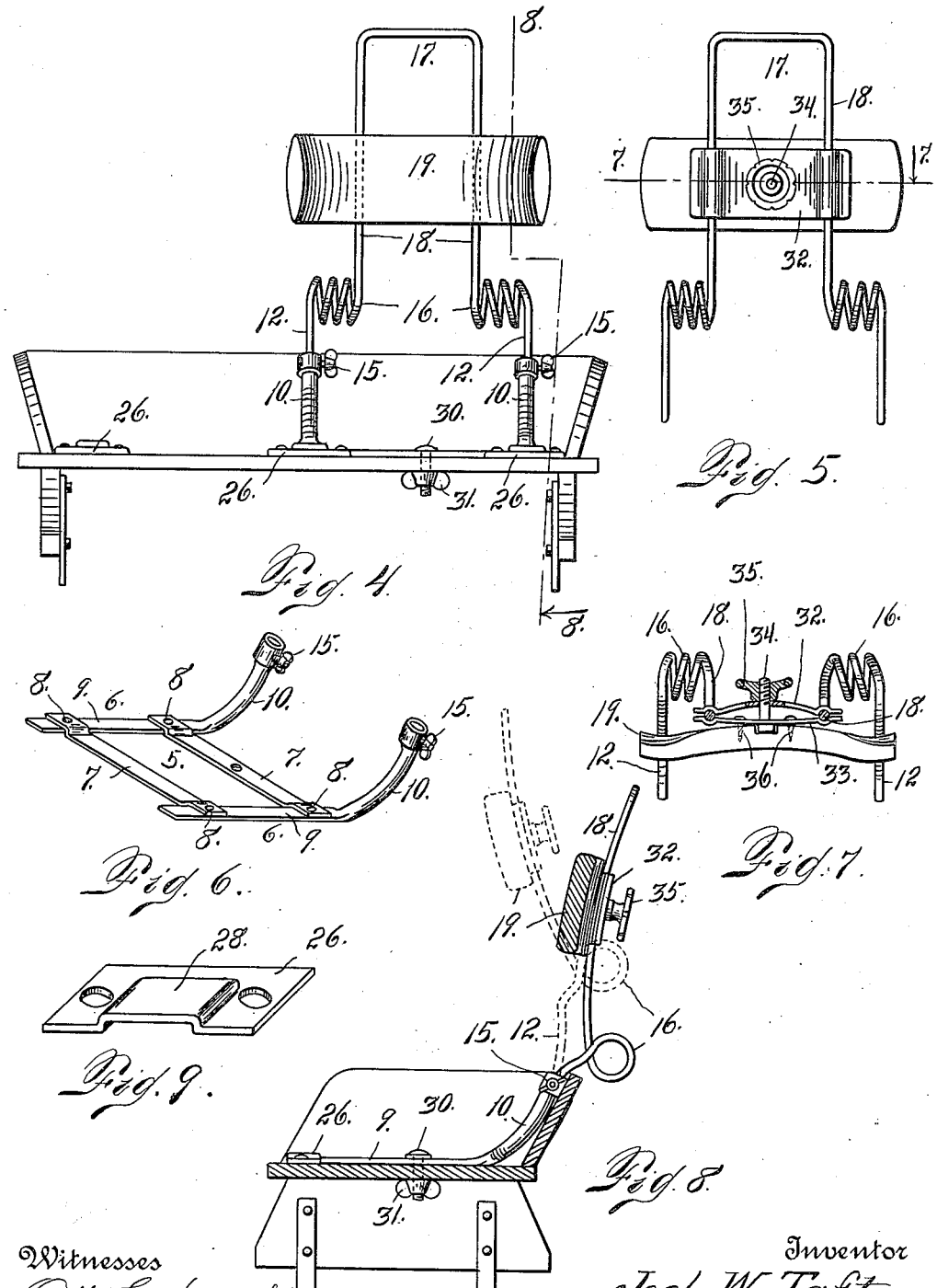

JOEL WHEELER TAFT, OF DENVER, COLORADO.

DETACHABLE SPRING-BACK FOR VEHICLE-SEATS.

1,064,181.   Specification of Letters Patent.   Patented June 10, 1913.

Application filed April 19, 1912. Serial No. 691,787.

*To all whom it may concern:*

Be it known that I, JOEL WHEELER TAFT, a citizen of the United States, residing in the city and county of Denver and State of Colorado, have invented certain new and useful Improvements in Detachable Spring-Backs for Vehicle-Seats; and I do declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to improvements in spring backs more especially adapted for use in connection with vehicle seats, but which may be employed in many other relations, as in locomotive cabs and in all places where it is desirable to ease the back of the rider and relieve him from the annoyance and possible injury of excessive vibration.

My improved spring back may be readily attached and detached, and may be employed in connection with vehicle seats of all kinds, whether heavy farm wagons or lighter carriages.

The construction consists of a frame-work adapted to be readily connected with and detached from a vehicle seat or other suitable support; and the back of the device, extending upwardly therefrom and readily detachable, the said back including spring rods connected to the rear surface of a back-board which is directly engaged by the back of the user when the seat is in use. This spring rod construction consists of a number of members whose lower extremities are curved to telescope in the hollow frame members which are correspondingly curved. These spring rod members are adjustable within the frame members by means of set-screws, and as the spring members are moved in one direction or the other within the frame members, the position of the back-board is changed, being thrown forwardly in one case, or when the spring members are moved upwardly; and thrown rearwardly when the spring members are moved in the opposite direction. By virtue of this adjustment, a position of the back-board may be maintained which will suit the comfort or convenience of all persons. In each of the spring wire or rod members, a spiral coil is formed. The axes of these coils may be either horizontal or vertical, or both horizontal and vertical, as may be desired, the convolutions of the spirals being relatively close, or more separated, according to the degree of movement that it is desired to obtain from the structure.

Having briefly outlined my improved construction, I will proceed to describe the same in detail, reference being made to the accompanying drawing in which is illustrated an embodiment thereof.

In this drawing: Figure 1 is a front view of one form of my improved spring-back applied to a seat in operative relation. Fig. 2 is a top-plan view of the same. Fig. 3 is a section taken on the line 3—3 Fig. 1, looking toward the left. Fig. 4 is a front view of another form of the device, showing what may be termed a single-spring back on a relatively long seat, the latter being equipped to permit the removal of the back from one part of the seat to another. Fig. 5 is a rear view of the spring-back member of the form of construction shown in Fig. 4. Fig. 6 is a perspective view of the rigid frame-member of the form of construction shown in Fig. 4. Fig. 7 is a section taken on the line 7—7 Fig. 5. Fig. 8 is a section taken on the line 8—8 Fig. 4 looking toward the left, the adjustable spring-member of the back being shown in two positions—one in full lines and the other in dotted lines. Fig. 9 is a perspective view in detail of a retaining clip employed in connection with my improved construction.

The same characters indicate the same parts in all the views.

Referring first more especially to the construction shown in Figs. 1 to 3 inclusive, let the numeral 5 designate the metal framework which, as illustrated in the drawing, consists of three bars 6 connected by metal straps 7 extending at right angles to the bars, the said metal straps being secured to the bars by means of rivets 8 or other suitable fastening devices. The bars 6 are composed of straight flat members 9 and cylindrical members 10 curved upwardly and rearwardly from the flat members, the members 10 being formed hollow to receive curved rod portions 12, 12 and 13 of the spring member 14 of my improved construction. The two rod members 12 as well as the rod member 13, are slidably adjustable in the parts 10, being locked in the desired position of adjustment by set-screws 15.

Above the telescoping rod-members 12, horizontally-disposed spiral spring members 16 are formed from which the spring portion of the seat back extends upwardly, forming an uninterrupted loop 17 whose opposite parallel side-parts 18 are connected with the back-board 19 of the structure, the parts 18 being clamped to the rear surface of the board by means of clamping members 20 to which are applied bolts 21, the clamping devices 20 possessing sufficient elasticity for the purpose. Above the telescoping spring rod part 13, a vertically-disposed spiral spring member is formed from which the rod continues upwardly in a part 23 which is secured to the central portion of the back-board 19 by means of a clamping member 24 of substantially the same construction as the clamping members 20, heretofore described. As illustrated in the drawing, the loop 17 extends considerably above the back-board, the latter being so arranged upon the spring rod construction as to accomplish the ends sought—namely, of giving the greatest ease and comfort to the back of the user. In applying the spring back to a seat 25, the latter is preferably equipped with clips 26 which are applied to the front portion of the seat by means of suitable fastening devices 27. Each of these clips has a struck-up part 28 adapted to receive one of the extremities of the flat portion 9 of each bar 6 as the device is applied to the seat. These clips aid in securing the device to the seat structure. In addition to this change in the seat bottom, the latter, in the rear of the clips 26, is provided with two holes 29 adapted to receive the shanks or bolts 30 which pass through openings formed in one of the metal straps 7. These bolts extend below the lower surface of the bottom of the seat and are secured in place by thumb-nuts 31. From this it will be understood that in order to remove the entire spring-back structure from the seat, it will only be necessary to remove the two thumb-nuts 31, after which, by a slight rearward movement of the spring-back structure, the forward extremities of the bars 6 may be detached from the retaining clips 26. Furthermore, should it be desired for any reason to leave the rigid frame-work of the spring-back in place upon the seat after detaching the spring-member which projects upwardly above the seat, it will only be necessary to loosen the thumb-nuts 15, in which event the entire spring portion of the structure may be readily removed.

In the form of construction shown in Figs. 4 to 8 inclusive, the spring-back construction is less in width and consists of but two parts 10, and two telescoping rod portions 12, arranged relatively close together as compared with the construction shown in Figs. 1 to 3 and merging into spiral spring parts 16, from which extends upwardly a relatively narrow loop 17 to which the back part 19 is secured. This form of construction is substantially the same as that disclosed in Figs. 1 to 3 inclusive, except that in Figs. 4 to 7 the central structure is composed of the parts 13, 22 and 23 and the accompanying bars 6 are omitted. Furthermore, in the construction shown in Figs. 4, 5, 7 and 8, the back-board 19 is secured to the loop 17 by two spring clamping members 32 and 33, a bolt 34 and a hand-nut 35. The clamping member 33 is secured to the rear surface of the back-board 19 by means of fastening devices 36, while the clamping member 32 is secured in place by means of the nut 35. The opposite extremities of these two clamping members are shaped to fit the opposite side parts 18, comprising the parallel side members of the loop 17. In the form of construction shown in Fig. 4, only a single bolt 30 will be required to connect the spring-back structure to the seat. However, in this case, two of the securing clips 26 will be employed in connection with the bars 6 of the structure. Furthermore, in this form of construction, the spring back is illustrated as applied toward one side or end of the seat. The device may be detached and moved to the opposite side, and in order to make this practicable, an extra retaining clip 26 is employed.

Attention is called to the fact that the convolutions of the horizontally-disposed spring parts 16 are shown considerably open in the drawing to indicate that a considerable range of lateral movement may be permitted. Of course, this feature may be regulated by making the convolutions nearer together or farther apart as may be desired and according to the range of lateral movement desirable.

Having thus described my invention, what I claim is:

1. The combination with a support having a number of retaining clips applied to the front portion thereof, the said clips having struck-up parts which, when applied to the support, form sockets open in the rear, bars whose forward extremities are adapted to enter said sockets, the said bars having rearwardly extending flat portions, the flat parts of the bars being permanently connected by metal straps provided with openings adapted to receive fastening bolts, the support having registering openings also adapted to receive said bolts which are held in place by nuts applied to their lower extremities, and a spring back connected to said flat bars, substantially as described.

2. In combination with a seat, an inverted U-shaped rod member attached at its extremities to the seat, an upright rod member attached to the seat midway between the arms of the U-shaped member, a back-rest mounted upon said vertical member and the arms of said U-shaped member, said arms between the back-rest and seat being bent into spiral coils having a common horizontal axis and said vertical member between the back-rest and seat being bent into a coil having a substantially vertical axis.

3. The combination with a seat, of hollow curved members secured thereto, spring rod members correspondingly curved at their lower extremities and adapted to slide within said hollow members, means for fastening said curved rod members in different positions and a back-rest vertically adjustable upon said spring rod members.

4. The combination with a seat, of three clips attached equi-distantly to the upper surface of said seat at its forward edge, said seat having holes therethrough at its rear edge midway between said clips, a single back-rest device having forwardly extending projections adapted to extend underneath two adjacent clips and having a hole adapted, when the back-rest is in the adjusted position, to register with one of the holes in the seat, a double back-rest device having three forwardly extending projections adapted to extend underneath the three clips and having two holes adapted, when the back-rest is in the adjusted position, to register with the two holes in the seat, and bolts adapted to extend through the registering holes for securing either of the devices to the seat.

In testimony whereof I affix my signature in presence of two witnesses.

JOEL WHEELER TAFT.

Witnesses:
A. J. O'BRIEN,
A. E. ADAMS.